United States Patent
Hirao et al.

(10) Patent No.: US 11,799,095 B2
(45) Date of Patent: Oct. 24, 2023

(54) CONDUCTIVE MEMBER, CELL, CELL STACK DEVICE, MODULE, AND MODULE HOUSING DEVICE

(71) Applicant: KYOCERA Corporation, Kyoto (JP)

(72) Inventors: Kazuki Hirao, Kirishima (JP); Akihiro Hara, Kirishima (JP); Atsuki Yamaguchi, Kirishima (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 17/799,905

(22) PCT Filed: Jun. 29, 2021

(86) PCT No.: PCT/JP2021/024594
§ 371 (c)(1),
(2) Date: Aug. 15, 2022

(87) PCT Pub. No.: WO2022/113411
PCT Pub. Date: Jun. 2, 2022

(65) Prior Publication Data
US 2023/0060449 A1  Mar. 2, 2023

(30) Foreign Application Priority Data
Nov. 26, 2020  (JP) .................... 2020-196272

(51) Int. Cl.
*H01M 8/0228* (2016.01)
*H01M 8/0206* (2016.01)
(Continued)

(52) U.S. Cl.
CPC ....... *H01M 8/0228* (2013.01); *H01M 8/0206* (2013.01); *H01M 8/0232* (2013.01); *H01M 8/2475* (2013.01)

(58) Field of Classification Search
None
See application file for complete search history.

(56) References Cited

U.S. PATENT DOCUMENTS 5,516,597 A * 5/1996 Singh ............... H01M 8/0215
429/479
2002/0025458 A1 * 2/2002 Faville ............... H01M 8/0612
429/423

(Continued)

FOREIGN PATENT DOCUMENTS

JP   H11-297339 A   10/1999
JP   2005-339904 A  12/2005

(Continued)

OTHER PUBLICATIONS

JPO; Decision to Grant issued in Japanese Patent Application No. 2021-564480; dated Feb. 18, 2022; 4 Pages.
(Continued)

*Primary Examiner* — Alix E Eggerding
(74) *Attorney, Agent, or Firm* — Procopio, Cory, Hargreaves & Savitch LLP

(57) ABSTRACT

A conductive member includes a base material and a covering part located on the base material and containing a first element. The base material contains chromium. The first element has a smaller value of first ionization energy and a smaller absolute value of free energy formation of oxide than chromium.

16 Claims, 15 Drawing Sheets

(51) Int. Cl.
*H01M 8/0232* (2016.01)
*H01M 8/2475* (2016.01)

(56) References Cited

U.S. PATENT DOCUMENTS

| | | |
|---|---|---|
| 2007/0218310 A1 | 9/2007 | Schuisky |
| 2011/0287341 A1 | 11/2011 | Inoue et al. |
| 2013/0004881 A1* | 1/2013 | Shaigan ............... C25D 5/12 |
| | | 429/465 |
| 2019/0067708 A1 | 2/2019 | Kozai |

FOREIGN PATENT DOCUMENTS

| | | |
|---|---|---|
| JP | 2007-220655 A | 8/2007 |
| JP | 2007-523997 A | 8/2007 |
| JP | 2007-273358 A | 10/2007 |
| JP | 2013051151 A | 3/2013 |
| JP | 2013-527309 A | 6/2013 |
| JP | 2015-088446 A | 5/2015 |
| JP | 2015-183252 A | 10/2015 |
| KR | 20200131554 A | 11/2020 |
| WO | 2009094289 A2 | 7/2009 |
| WO | 2009/131180 A1 | 10/2009 |
| WO | 2017/131176 A1 | 8/2017 |

OTHER PUBLICATIONS

JPO; Notification of Reasons for Refusal issued in Japanese Patent Application No. 2021-564480; dated Dec. 9, 2021; 4 Pages.
PCT; International Search Report issued in International Patent Application No. PCT/JP2021/024594; dated Aug. 31, 2021; 5 Pages.
PCT; Written Opinion issued in International Patent Application No. PCT/JP2021/024594; dated Aug. 31, 2021; 5 Pages.
Written Opinion of the International Searching Authority for the corresponding PCT Application No. PCT/JP2021/024594 dated Aug. 31, 2021, 6 pages.
Decision to Grant a Patent issued in Japanese Patent Application No. 2021-564480; dated Feb. 18, 2022; 4 Pages.
Notification of Reasons for Refusal issued in Japanese Patent Application No. 2021-564480; dated Dec. 9, 2021; 7 Pages.
International Search Report and Written Opinion issued in International Patent Application No. PCT/JP2021/024594 dated Aug. 31, 2021; 14 Pages.

* cited by examiner

CONDUCTIVE MEMBER, CELL, CELL STACK DEVICE, MODULE, AND MODULE HOUSING DEVICE

CROSS-REFERENCE TO RELATED APPLICATIONS

This application is the U.S. National Stage Application under 35 U.S.C & 371 of International Application No. PCT/JP2021/024594, filed on Jun. 29, 2021, designating the United States, and published as WO2022/113411 on Jun. 2, 2022, which claims the benefit of priority from Japanese Patent Application No. 2020-196272, filed on Nov. 26, 2020. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present disclosure relates to a conductive member, a cell, a cell stack device, a module, and a module housing device.

BACKGROUND ART

In recent years, various fuel cell stack devices each including a plurality of fuel cells have been proposed as next-generation energy, the plurality of fuel cells each being a type of cell capable of obtaining electrical power by using a fuel gas such as a hydrogen-containing gas; and an oxygen-containing gas such as air.

CITATION LIST

Patent Literature

Patent Document 1: WO 2009/131180

SUMMARY OF INVENTION

A conductive member according to an aspect of an embodiment includes a base material and a covering part located on the base material and containing a first element. The base material contains chromium. The first element has a smaller value of first ionization energy and a smaller absolute value of free energy formation of oxide than chromium.

Also, a cell of the present disclosure includes an element unit and the conductive member mentioned above. The conductive member is connected to the element unit Also, a cell stack device of the present disclosure includes a cell stack including a plurality of the cells mentioned above.

Also, a module of the present disclosure includes the cell stack device mentioned above and a housing container that houses the cell stack device.

Also, a module housing device of the present disclosure includes the module mentioned above, an auxiliary device for operating the module, and an external case that houses the module and the auxiliary device.

DESCRIPTION OF EMBODIMENTS

Hereinafter, embodiments of a conductive member, a cell, a cell stack device, a module, and a module housing device disclosed in the present specification will be described in detail with reference to the accompanying drawings. This disclosure is not limited by the following embodiments.

In addition, it should be noted that the drawings are schematic, and the relationship between the dimensions of each element, the ratio of each element, or the like may differ from reality. In addition, there may be differences between the drawings in the dimensional relationships, proportions, or the like.

First Embodiment

Configuration of Cell

First, with reference to FIGS. 1A to 1C, an example of a solid oxide type fuel cell will be described as a cell according to a first embodiment.

Figure 1A:
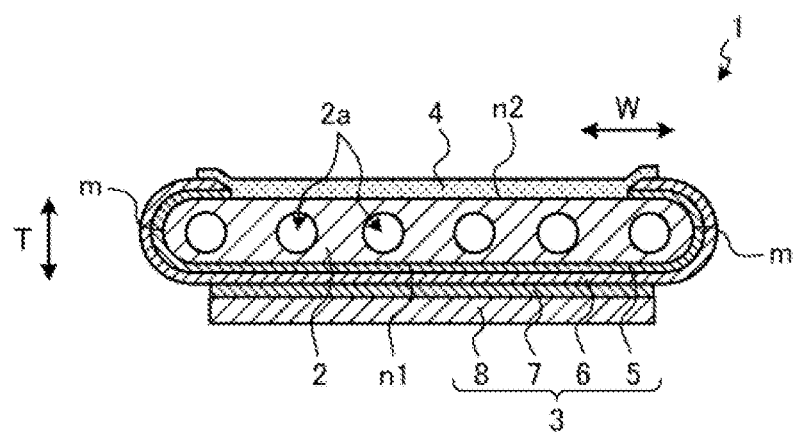
FIG. 1A is a horizontal cross-sectional view illustrating an example of a cell according to a first embodiment.
Figure 1B:
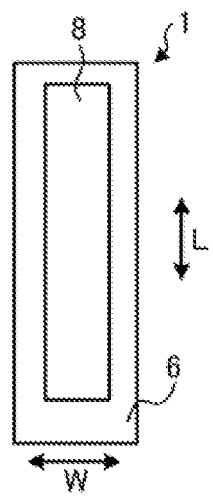
FIG. 1B is a side view of an example of the cell according to the first embodiment when viewed from an air electrode side.
Figure 1C:
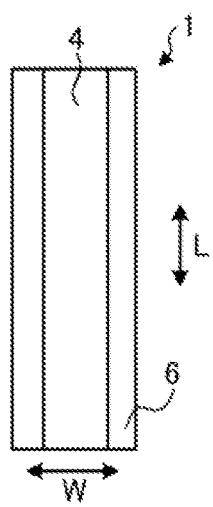
FIG. 1C is a side view of an example of the cell according to the first embodiment when viewed from an interconnector side.

FIG. 1A is a horizontal cross-sectional view illustrating an example of a cell 1 according to a first embodiment, FIG. 1B is a side view of an example of the cell according to the first embodiment when viewed from an air electrode side, and FIG. 1C is a side view of an example of the cell 1 according to the first embodiment when viewed from an interconnector side. FIGS. 1A to 1C are enlarged views of a part of each configuration of the cell 1.

In the example illustrated in FIGS. 1A to 1C, the cell 1 has a hollow flat and elongated plate. As illustrated in FIG. 1B, the shape of the entire cell 1 when viewed from the side is a rectangle having a side length of, for example, 5 cm to 50 cm in a length direction L and a length of, for example, 1 cm to 10 cm in a width direction W orthogonal to the length direction L. The thickness of the entire cell 1 in a thickness direction T is, for example, 1 mm to 5 mm.

As illustrated in FIG. 1A, the cell 1 includes a support substrate 2 that is electrically conductive, an element unit 3, and an interconnector 4. The support substrate 2 is columnar with a pair of opposing flat surfaces n1 and n2, and a pair of circular arc shape side surfaces m connecting the flat surfaces n1 and n2.

The element unit 3 is located on the flat surface n1 of the support substrate 2. The element unit 3 includes a fuel electrode 5, a solid electrolyte layer 6, and an air electrode 8. Also, in the example illustrated in FIG. 1A, the interconnector 4 is located on the flat surface n2 of the cell 1. The cell 1 includes an intermediate layer 7 between the solid electrolyte layer 6 and the air electrode 8.

Also, as illustrated in FIG. 1B, the air electrode 8 does not extend to a lower end of the cell 1. At the lower end of the cell 1, only the solid electrolyte layer 6 is exposed on a surface of the flat surface n1. Also, as illustrated in FIG. 1C, the interconnector 4 may extend to the lower end of the cell 1. At the lower end of the cell 1, the interconnector 4 and the solid electrolyte layer 6 are exposed on the surface. As illustrated in FIG. 1A, the solid electrolyte layer 6 is exposed on the surfaces of the pair of circular arc shape side surfaces m of the cell 1. The interconnector 4 may not extend to the lower end of the cell 1.

Hereinafter, each of the components constituting the cell 1 will be described.

The support substrate 2 includes an internal gas-flow passage 2a through which gas flows. The example of the support substrate 2 illustrated in FIG. 1A includes six gas-flow passages 2a. The support substrate 2 has gas permeability, and allows the gas flowing in the gas-flow passage 2a to permeate to the fuel electrode 5. The support substrate 2 may have conductivity. The support substrate 2, which is electrically conductive, collects electricity generated in the element unit to the interconnector 4.

The material of the support substrate 2 contains, for example, an iron group metal component and an inorganic oxide. For example, the iron group metal component may be, for example, Ni (nickel) and/or NiO. The inorganic oxide may be, for example, a specific rare earth element oxide. The rare earth element oxide may contain, for example, one or more rare earth elements selected from Sc, Y, La, Nd, Sm, Gd, Dy, and Yb.

As the material of the fuel electrode 5, generally known materials can be used. As the fuel electrode 5, porous conductive ceramics, for example, ceramics containing: $ZrO_2$ in which a calcium oxide, a magnesium oxide, or a rare earth element oxide is solid-dissolved, and Ni and/or NiO may be used. This rare earth element oxide may contain a plurality of rare earth elements selected from, for example, Sc, Y, La, Nd, Sm, Gd, Dy, and Yb. $ZrO_2$ in which a calcium oxide, a magnesium oxide, or a rare earth element oxide is solid-dissolved may also be referred to as stabilized zirconia. The stabilized zirconia also includes partially stabilized zirconia.

The solid electrolyte layer 6 is an electrolyte and bridges ions between the fuel electrode 5 and the air electrode 8. At the same time, the solid electrolyte layer 6 has a gas blocking property and prevents leakage between a fuel gas and an oxygen-containing gas.

The material of the solid electrolyte layer 6 may be, for example, $ZrO_2$ in which 3 mol % to 15 mol % of a rare earth element oxide is solid-dissolved. The rare earth element oxide may contain, for example, one or more rare earth elements selected from Sc, Y, La, Nd, Sm, Gd, Dy, and Yb. The solid electrolyte layer 6 may contain, for example, $ZrO_2$ in which Yb, Sc, or Gd is solid-dissolved, $CeO_2$ in which La, Nd, or Yb is solid-dissolved, $BaZrO_3$ in which Sc or Yb is solid-dissolved, or $BaCeO_3$ in which Sc or Yb is solid-dissolved.

The air electrode 8 has gas permeability. The open porosity of the air electrode 8 may be, for example, in the range of 20% to 50%, particularly 30% to 50%. The open porosity of the air electrode 8 may also be referred to as the porosity of the air electrode 8.

The material of the air electrode 8 is not particularly limited as long as it is generally used for the air electrode. The material of the air electrode 8 may be, for example, conductive ceramics such as a so-called $ABO_3$ type perovskite oxide.

The material of the air electrode 8 may be, for example, a composite oxide in which strontium (Sr) and lanthanum (La) coexist at the A site. Examples of such a composite oxide include $La_xSr_{1-x}Co_yFe_{1-y}O_3$, $La_xSr_{1-x}MnO_3$, $La_xSr_{1-x}FeO_3$, and $La_xSr_{1-x}CoO_3$. Here, x is $0<x<1$ and y is $0<y<1$.

Also, when the element unit 3 has the intermediate layer 7, the intermediate layer 7 has a function as a diffusion prevention layer. When strontium (Sr) contained in the air electrode 8 diffuses into the solid electrolyte layer 6, a resistance layer of $SrZrO_3$ is formed in the solid electrolyte layer 6. The intermediate layer 7 makes it difficult for Sr to diffuse, thereby making it difficult for $SrZrO_3$ to be formed.

The material of the intermediate layer 7 is not particularly limited as long as it is generally used for the diffusion prevention layer of Sr. The material of the intermediate layer 7 may contain, for example, a cerium oxide ($CeO_2$) in which rare earth elements other than cerium (Ce) are solid-dissolved. As such rare earth elements, for example, gadolinium (Gd), samarium (Sm), or the like may be used.

Also, the interconnector 4 is dense and prevents leakage of the fuel gas flowing through the gas-flow passage 2a located inside the support substrate 2 and the oxygen-containing gas flowing outside the support substrate 2. The interconnector 4 may have a relative density of 93% or more, particularly 95% or more.

As the material of the interconnector 4, a lanthanum chromite-based perovskite oxide ($LaCrO_3$-based oxide), a lanthanum strontium titanium-based perovskite oxide ($LaSrTiO_3$-based oxide), or the like may be used. These materials are electrically conductive and are not reduced or oxidized even in contact with a fuel gas such as a hydrogen-containing gas and an oxygen-containing gas such as air.

Configuration of Cell Stack Device

Figure 2A:
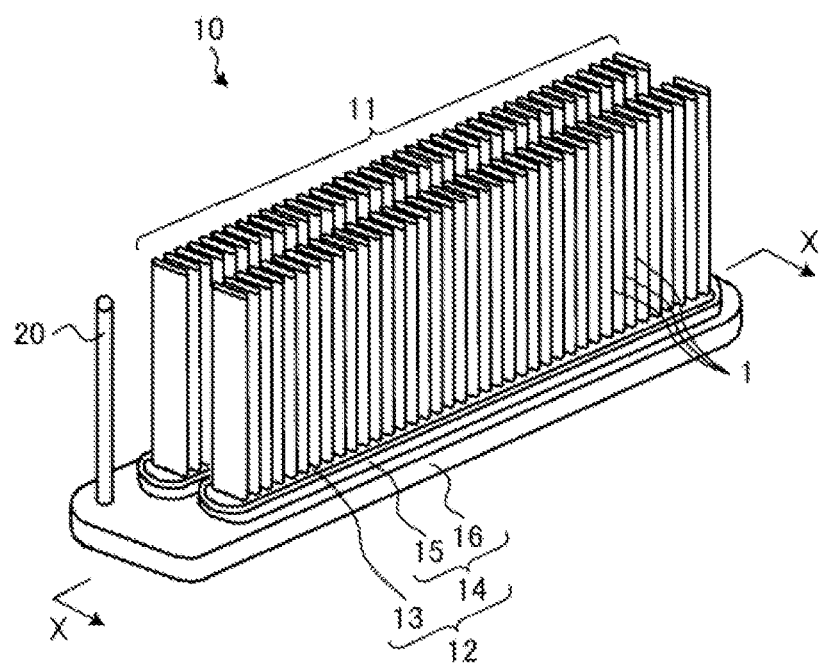
FIG. 2A is a perspective view illustrating an example of a cell stack device according to the first embodiment.

Next, a cell stack device 10 according to the present embodiment using the cell 1 mentioned above will be described with reference to FIGS. 2A to 2C. FIG. 2A is a perspective view illustrating an example of a cell stack device according to the first embodiment, FIG. 2B is a cross-sectional view taken along line X-X illustrated in FIG. 2A, and FIG. 2C is a top view illustrating an example of the cell stack device according to the first embodiment.

As illustrated in FIG. 2A, the cell stack device 10 includes a cell stack 11 including a plurality of cells 1 arranged (stacked) in a thickness direction T (see FIG. 1A) of the cell 1, and a fixing member 12.

The fixing member 12 includes a fixing material 13 and a support member 14. The support member 14 supports the cell 1. The fixing material 13 fixes the cell 1 to the support member 14. The support member 14 includes a support body 15 and a gas tank 16. The support body 15 and the gas tank 16, as the support member 14, are made of metal and electrically conductive.

Figure 2B:
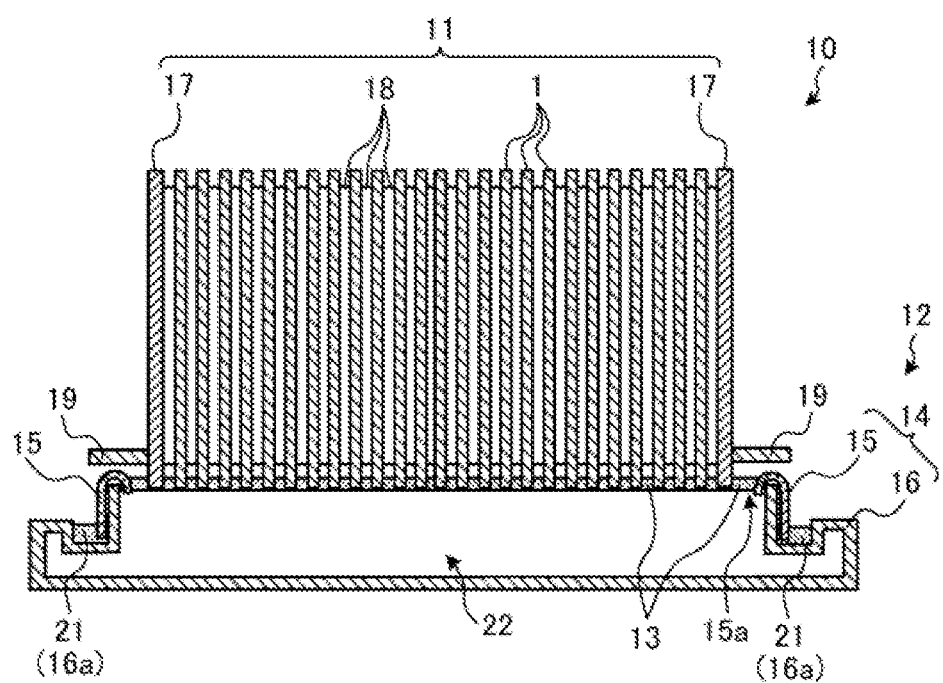
FIG. 2B is a cross-sectional view taken along line X-X illustrated in FIG. 2A.
Figure 2C:
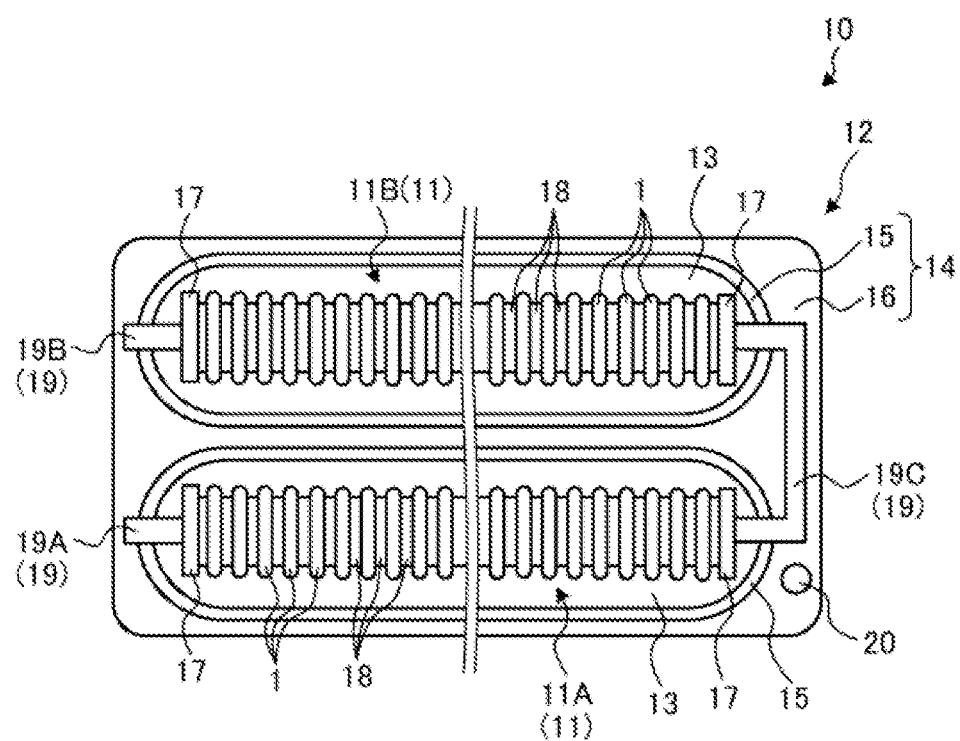
FIG. 2C is a top view illustrating an example of the cell stack device according to the first embodiment.

As illustrated in FIG. 2B, the support body 15 includes an insertion hole 15a into which the lower ends of the plurality of cells 1 are inserted. The lower ends of the plurality of cells 1 and the inner wall of the insertion hole 15a are joined by a fixing material 13.

The gas tank 16 includes an opening for supplying a reactive gas to the plurality of cells 1 through the insertion hole 15a, and a recessed groove 16a located around the opening. The outer peripheral end portion of the support body 15 is joined to the gas tank 16 by a jointing material 21 with which the recessed groove 16a of the gas tank 16 is filled.

In the example illustrated in FIG. 2A, a fuel gas is stored in an internal space 22 formed by the support body 15 and the gas tank 16, which constitute the support member 14. A gas flow pipe 20 is connected to the gas tank 16. A fuel gas is supplied to the gas tank 16 through the gas flow pipe 20, and supplied from the gas tank 16 to the gas-flow passage 2a (see FIG. 1A) inside the cell 1. The fuel gas supplied to the gas tank 16 is generated by a reformer 102 (see FIG. 5) to be described later.

A hydrogen-rich fuel gas can be produced by, for example, steam reforming the raw fuel. When the fuel gas is produced by steam reforming, the fuel gas contains steam.

The example illustrated in FIG. 2A includes two rows of cell stacks 11, two support bodies 15, and the gas tank 16. Two rows of cell stacks 11 each have a plurality of cells 1. Each cell stack 11 is fixed to each support body 15. The gas tank 16 includes two through holes on its upper surface. Each support body 15 is disposed in each through hole. The internal space 22 is formed by one gas tank 16 and two support bodies 15.

The shape of the insertion hole 15a has, for example, an oval shape in a top surface view. The insertion hole 15a is configured, for example, to have a length in the array direction or thickness direction T of the cell 1 is greater than the distance between the two end current collectors 17 located at the both ends of the cell stack 11. The width of the insertion hole 15a is, for example, greater than the length in the width direction W of the cell 1 (see FIG. 1A).

As illustrated in FIG. 2B, the joined portion between the inner wall of the insertion hole 15a and the lower end of the cells 1 is filled with the fixing material 13. Thus, the inner wall of the insertion hole 15a and each of the lower ends of the plurality of cells 1 are joined and fixed, and the lower ends of the cells 1 are joined and fixed to each other. The gas-flow passage 2a of each cell 1, at its lower end, communicates with the internal space 22 of the support member 14.

The fixing material 13 and the jointing material 21 may be made of a material having low conductivity such as glass. As the specific materials of the fixing material 13 and the jointing material 21, amorphous glass or the like may be used, and especially, crystallized glass or the like may be used.

As the crystallized glass, for example, any of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or particularly, a $SiO_2$—MgO-based material may be used.

Also, as illustrated in FIG. 2B, conductive members 18 are each interposed between the adjacent cells 1 among the plurality of cells 1. The conductive member 18 electrically connects, in series, the fuel electrode 5 of one of the adjacent cells 1 and the air electrode 8 of the other one of the adjacent cells 1. More specifically, the conductive member 18 electrically connects the interconnector 4 electrically connected to the fuel electrode 5 of the one of the adjacent cells 1 and the air electrode 8 of the other one of the adjacent cells 1. The conductive member 18 connected to the adjacent cells 1 will be described in detail later.

As illustrated in FIG. 2B, the end current collector 17 is electrically connected to each of the outermost cells 1 in the array direction of the plurality of cells 1. The end current collectors 17 are each connected to a conductive portion 19 protruding outside the cell stack 11. The conductive portions 19 collect and draw out the electricity generated due to power generation by the cells 1. In FIG. 2A, the end current collectors 17 are not illustrated.

As illustrated in FIG. 2C, in the cell stack device 10, two cell stacks 11A and 11B are connected in series and function as one battery. Therefore, a conductive portion 19 of the cell stack device 10 is divided into a positive terminal 19A, a negative terminal 19B, and a connection terminal 19C.

The positive terminal 19A is a positive electrode for outputting the electrical power generated by the cell stack 11 to the outside, and is electrically connected to the end current collector 17 on the positive electrode side in the cell stack 11A. The negative terminal 19B is a negative electrode for outputting the electrical power generated by the cell stack 11 to the outside, and is electrically connected to the end current collector 17 on the negative electrode side in the cell stack 11B.

The connection terminal 19C electrically connects the end current collector 17 on the negative electrode side in the cell stack 11A and the end current collector 17 on the positive electrode side in the cell stack 11B.

Details of Conductive Member

Figure 3:
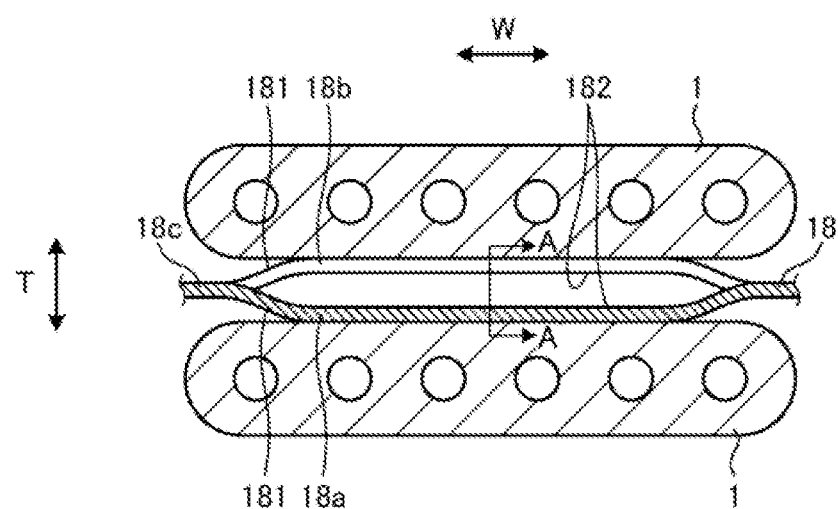
FIG. 3 is a horizontal cross-sectional view illustrating an example of a conductive member according to an embodiment.

Subsequently, details of the conductive member 18 according to the first embodiment will be described in detail with reference to FIG. 3, FIG. 4A, and FIG. 4B. FIG. 3 is a horizontal cross-sectional view illustrating an example of a conductive member according to an embodiment.

As illustrated in FIG. 3, the conductive member 18 includes connection portions 18a connected to one of the adjacent cells 1 and connection portions 18b connected to the other one of the adjacent cells 1. Also, the conductive member 18 includes connecting portions 18c at both ends in the width direction W to connect the connection portions 18a and 18b. This enables the conductive member 18 to electrically connect the cells 1 adjacent to each other in the thickness direction T. In FIG. 3, the shape of the cell 1 is illustrated by simplification.

Also, the connection portions 18a and 18b each include a first surface 181 facing the cell 1 and a second surface 182 facing the connection portions 18b and 18a.

Figure 4A:
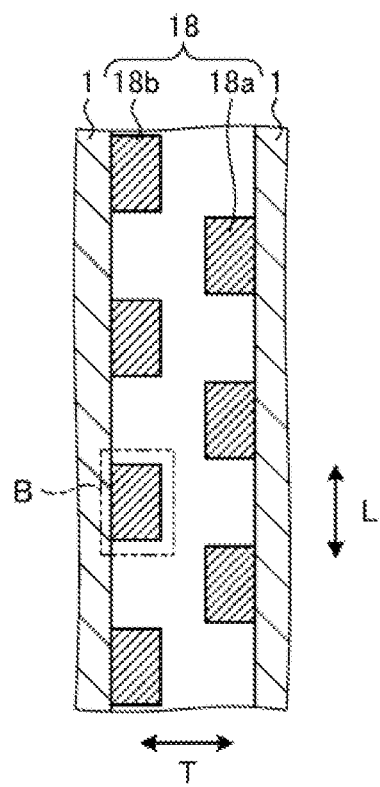
FIG. 4A is a cross-sectional view taken along line A-A illustrated in FIG. 3.

FIG. 4A is a cross-sectional view taken along line A-A illustrated in FIG. 3. FIG. 4B is an enlarged view of region B illustrated in FIG. 4A.

The conductive member 18 extends in the length direction L of the cell 1. As illustrated in FIG. 4A, a plurality of the connection portions 18a and 18b of the conductive member 18 are alternately located along the length direction L of the cell 1. The conductive member 18 is in contact with the cell 1 at each of the connection portions 18a and 18b.

Figure 4B:
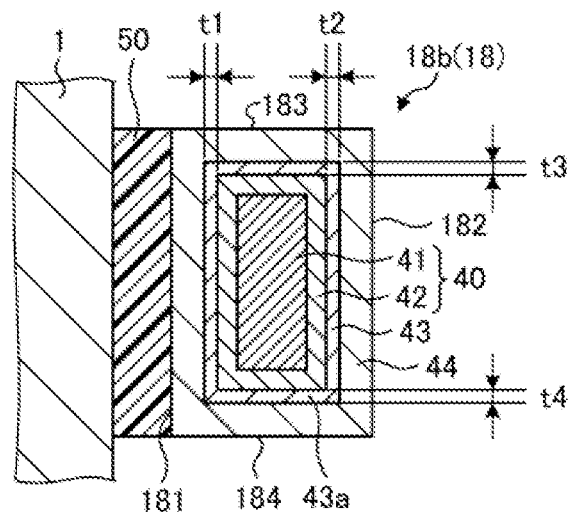
FIG. 4B is an enlarged view of region B illustrated in FIG. 4A.

Also, as illustrated in FIG. 4B, the conductive member 18 includes a base material 40, a covering part 43, and a coating layer 44. The coating layer 44 has conductivity. Also, the conductive member 18 has the first surface 181 and the second surface 182 that face each other with the base material 40 interposed therebetween. Also, the conductive member 18 has third surfaces 183 and 184 that connect the first surface 181 and the second surface 182.

The conductive member 18 (connection portion 18b) is joined to the cell 1 via a jointing material 50. The jointing material 50 is located between the first surface 181 of the conductive member 18 and the cell 1, and joins the conductive member 18 and the cell 1. Also, the second surface 182 and the third surfaces 183 and 184 are exposed to, for example, an oxidizing atmosphere such as air.

The base material 40 has electrical conductivity and heat resistance. The base material 40 contains chromium. The base material 40 is, for example, stainless steel. The base material 40 may contain, for example, a metal oxide.

Also, the base material 40 may also have a laminated structure. In the example illustrated in FIG. 4B, the base material 40 includes a first base material layer 41 and a second base material layer 42. The second base material layer 42 may have a higher chromium content than the first base material layer 41, for example. The second base material layer 42 contains, for example, a chromium oxide ($Cr_2O_3$). In this way, as the base material 40 has the second base material layer 42, the durability of the conductive member 18 is enhanced. The base material 40 may or may not have the second base material layer 42 partially. Also, the base material 40 may have a further laminated structure.

The covering part 43 is located on the base material 40. The covering part 43 is located between the base material 40 and the coating layer 44. The covering part 43 contains first elements 43a. The covering part 43 contains, for example, Ce. The first element 43a has a smaller value of first ionization energy and a smaller absolute value of free energy formation of oxide than chromium. Examples of the first element 43a include Eu, Pr, Zr, and the like in addition to Ce. The free energy of formation is also called Gibbs energy of formation. The free energy of formation can be confirmed in, for example, a thermodynamic database such as "Thermodynamic Database for Nuclear Fuels and Reactor Materials". The first element 43a may be located on the base material 40 as an oxide of such an element. Examples of the oxide of the first element 43a include $CeO_2$, $EuO$, $PrO_2$, and $ZrO_2$. Hereinafter, the oxide of the first element 43a is referred to as a first oxide.

The covering part 43 may be a plurality of particles located on the base material 40 and containing the first element 43a. Also, the covering part 43 may be a coating film containing the first element 43a and covering the base material 40. The covering part 43 may be one coating film covering the entire base material 40, or may be located on the base material 40 as a mesh-like coating film or a plurality of island-like coating films separated from each other. The plurality of particles and coating films containing the first element 43a are collectively referred to as the covering part 43. The covering part 43 may contain, for example, one or more of the first elements 43a. The covering part 43 may contain elements other than the first element 43a. The covering part 43 may contain, for example, $CeO_2$ in which gadolinium (Gd) is solid-dissolved, or $ZrO_2$ in which yttrium (Y), ytterbium (Yb), and the like are solid-dissolved, so-called stabilized zirconia or partially stabilized zirconia. That is, the covering part 43 may include a plurality of particles and/or coating films containing the first element 43a. When the covering part 43 has the plurality of particles and coating films containing the first element 43a, the plurality of particles may be located on the base material 40 or may be located on the coating film.

The covering part 43 can be formed on the surface of the base material 40 by, for example, a film formation method such as an ion-beam assisted deposition (IAD) method, a metal organic decomposition (MOD) method, a sputtering method, an aerosol deposition (AD) method, and a pulsed laser deposition (PLD) method.

The covering part 43 containing the first element 43a may be crystalline or amorphous. Also, a crystalline phase and an amorphous phase may be mixed in the covering part 43.

In this way, since the conductive member 18 includes the covering part 43 located on the base material 40 and containing the first element 43a, the growth of the second base material layer 42 is suppressed, so that the conductive member 18 can suppress an increase in internal resistance due to the growth of the second base material layer 42. This can reduce a decrease in the battery performance of the cell 1.

Also, the thickness of the covering part 43 may be, for example, 5 nm or more and 150 nm or less, 10 nm or more and 130 nm or less, or further 20 nm or more and 100 nm or less. When the covering part 43 has such a thickness, for example, the growth of the second base material layer 42 is suppressed, and even though the conductivity of the covering part 43 is small, the influence of the covering part 43 on the internal resistance is suppressed, so that the conductive member 18 can suppress an increase in the internal resistance. This can reduce a decrease in the battery performance of the cell 1. For example, the conductivity of $Cr_2O_3$ is 1.5 S/m and the conductivity of $CeO_2$ is 0.07 S/m. When a conductive member of the base material 40 alone or a conductive member forming the coating layer 44, which will be described later, directly formed on the base material 40 is used at the operating temperature of the fuel cell, the thickness of the second base material layer 42 is about several μm, for example, 4 μm. On the other hand, when the conductive member 18 having the covering part 43 on the base material 40 is used at the operating temperature of the fuel cell, the thickness of the second base material layer 42 is 1 μm or less. Specifically, for example, in the conductive member 18 including $CeO_2$ having a thickness of 10 nm as a coating film, since the thickness of the second base material layer is about 0.8 μm, the internal resistance can be made smaller than when there is no coating film.

The presence or absence of the first element 43a and the size of the covering part 43 containing the first element 43a can be confirmed, for example, by mapping the first element 43a in the cross-section of the conductive member 18 by using a high angle annular dark field scanning transmission electron microscope (HAADF-STEM), a focus ion beam scanning electron microscope (FIB-SEM), or an electron probe microanalyzer (EPMA). Also, an average thickness of the following coating films is obtained, for example, by mapping the above element in the cross-section of the conductive member 18 at a magnification of 100 million times by using the HAADF-STEM with an accelerating voltage of 200 kV, measuring the thickness of a portion, where the first element 43a is detected, at 10 points, and calculating an average value of the thicknesses.

Also, an average thickness t1 of coating films located between the first surface 181 and the base material 40 of the conductive member 18 may be the same as or different from an average thickness t3 of coating films located between the third surface 183 and the base material 40 and an average thickness t4 of coating films located between the third surface 184 and the base material 40. The average thickness t1 as a first average thickness may be greater than the average thicknesses t3 and t4 as second average thicknesses. In this way, the average thickness t1 is made greater than the average thicknesses t3 and t4, resulting in the suppression of the growth of the second base material layer 42 at a place close to the first surface 181 through which the current flows. The average thicknesses t3 and t4 may be less than 5 nm, for example. Also, the conductive member 18 may have no coating film in at least one of between the third surface 183 and the base material 40 and between the third surface 184 and the base material 40. Since current may not flow easily at a place close to the third surfaces 183 and 184, the second base material layer 42 may be thicker than at the place close to the first surface 181. The conductive member 18 includes the second base material layer 42 that is thicker at the place close to the third surfaces 183 and 184 than the place close to the first surface 181, resulting in the suppression of the oxidation of the base material 40. This can reduce a decrease in the battery performance of the cell 1.

The average thicknesses t3 and t4 may be greater than the average thickness t1, for example, greater than 150 nm. Since current may not flow easily at the place close to the third surfaces 183 and 184, the average thickness t3 and t4 may be large in this way. When the average thicknesses t3 and t4 are greater than the average thickness t1, the growth of the second base material layer 42 is suppressed on the third surfaces 183 and 184, and the release of chromium contained in the base material 40 can be suppressed. The average thickness t2 of the coating film located between the second surface 182 and the base material 40 of the conductive member 18 may be greater or smaller than the average thicknesses t3 and t4.

Also, a first area ratio, which is an area ratio of the covering part 43 located between the first surface 181 and the base material 40, may be the same as or different from a second area ratio which is an area ratio of the covering part 43 located between the third surfaces 183 and 184 and the base material 40. The first area ratio may be greater than the second area ratio. In this way, the first area ratio is made greater than the second area ratio, resulting in the suppression of the growth of the second base material layer 42 at the place close to the first surface 181 through which current flows. The first area ratio may be, for example, 20 area % or more and 100 area % or less. The second area ratio may be, for example, 0 area % or more and 100 area % or less. An area ratio of the covering part 43 located between the second surface 182 and the base material 40 may be greater than or smaller than the second area ratio.

Each of the area ratios mentioned above can be calculated as follows, for example. First, it can be confirmed by polishing the cross-section of the conductive member 18, and mapping the first element 43a on the base material 40 by using the HAADF-STEM, the focus ion beam scanning electron microscope (FIB-SEM), or the electron probe microanalyzer (EPMA). Specifically, for example, using the HAADF-STEM with an accelerating voltage of 200 kV, a mapping image of the first element 43a is obtained in the cross-section of the conductive member 18 at a magnification of, for example, 3000 times to 5000 times. The obtained mapping image is image-analyzed by using the analysis software Igor manufactured by Hulinks Co., Ltd to calculate the area ratio of the first element 43a overlapping the base material 40 when viewed from the normal direction of each surface. The obtained area ratio of the first element 43a is the area ratio of the covering part 43.

The coating layer 44 covers the covering part 43 over the thickness direction T and the length direction L of the entire cell 1. The coating layer 44 contains an element different from that of the covering part 43. The coating layer 44 is located between the base material 40 and the oxidizing atmosphere, which makes it possible to suppress the release of chromium contained in the base material 40, for example. Therefore, the durability of the conductive member 18 is improved, so that the durability of the cell 1 can be improved.

Also, the coating layer 44 may contain an oxide containing, for example, manganese (Mn) and cobalt (Co). Hereinafter, the oxide containing Mn and Co is referred to as a second oxide. The second oxide has electron conductivity. The second oxide has higher conductivity than $Cr_2O_3$ and the first oxide. The second oxide may have higher conductivity than $Cr_2O_3$ by 100 times, for example. A molar ratio of Mn contained in the second oxide may be greater than that of Co. The coating layer 44 may contain, for example, a second oxide having a molar ratio of Mn, Co, and O of 1.66:1.34:4. When the coating layer 44 contains the second oxide having such a composition, for example, the durability of the conductive member 18 can be increased as compared with the coating layer 44 containing a second oxide having a molar ratio of Mn, Co, and O of 1.5:1.5:4. The molar ratio of Mn, Co, and O can be calculated on the basis of the identification of a crystal phase using an X-ray diffractometer (XRD). Also, the second oxide may contain elements other than Mn and Co, for example, zinc (Zn), iron (Fe) and aluminum (Al). The coating layer 44 may or may not contain the first element 43a. When the coating layer 44 contains the first element 43a, the content of the first element 43a in the coating layer 44 is smaller than that of the first element 43a in the covering part 43.

Also, the coating layer 44 may be porous. The coating layer 44 may have a porosity of 5% or more and 40% or less, for example. When the conductive member 18 includes the porous coating layer 44 in this way, stress applied to the conductive member 18 from the outside can be relieved. Therefore, the durability of the conductive member 18 is improved, so that the durability of the cell 1 can be improved.

The coating layer 44 can be formed by, for example, a thermal spraying method, a vapor deposition method, an electrodeposition method, a sputtering method, or the like. For example, a coating material may be coated on the covering part 43 or the surface of the coating film, and then fired to form the coating layer 44.

Module

Figure 5:
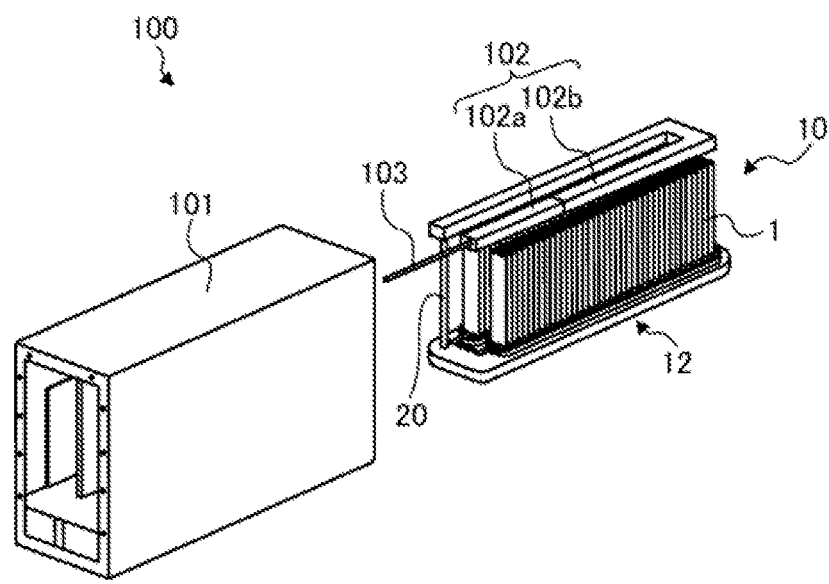
FIG. 5 is an external appearance perspective view illustrating an example of a module according to the first embodiment.

Next, a module 100 according to an embodiment of the present disclosure using the cell stack device 10 mentioned above will be described with reference to FIG. 5. FIG. 5 is an external appearance perspective view illustrating a module according to the first embodiment, and illustrates a state in which a front surface and a rear surface, which are a part of a housing container 101 are removed and the cell stack device 10 of the fuel cell housed therein is taken out rearward.

As illustrated in FIG. 5, the module 100 includes the housing container 101 and the cell stack device 10 housed in the housing container 101. Also, the reformer 102 is disposed above the cell stack device 10.

The reformer 102 generates a fuel gas by reforming a raw fuel such as natural gas and kerosene, and supplies the fuel gas to the cell 1. The raw fuel is supplied to the reformer 102 through the raw fuel supply pipe 103. The reformer 102 may include a vaporizing unit 102a for vaporizing water and a reforming unit 102b. The reforming unit 102b includes a reforming catalyst (not illustrated) for reforming the raw fuel into a fuel gas. Such a reformer 102 can perform steam reforming, which is a highly efficient reforming reaction.

Then, the fuel gas generated by the reformer 102 is supplied to the gas-flow passage 2a (see FIG. 1A) of the cell 1 through the gas flow pipe 20, the gas tank 16, and the support member 14.

Also, in the module 100 having the configuration mentioned above, the temperature in the module 100 during normal power generation is about 500° C. to 1000° C. due to combustion of gas and power generation by the cell 1.

In such a module 100, as mentioned above, it is configured to house the cell stack device 10 including the plurality of cells 1 for reducing the deterioration of battery performance, so that the module 100 that reduces the decrease in the battery performance can be provided.

Module Housing Device

Figure 6:
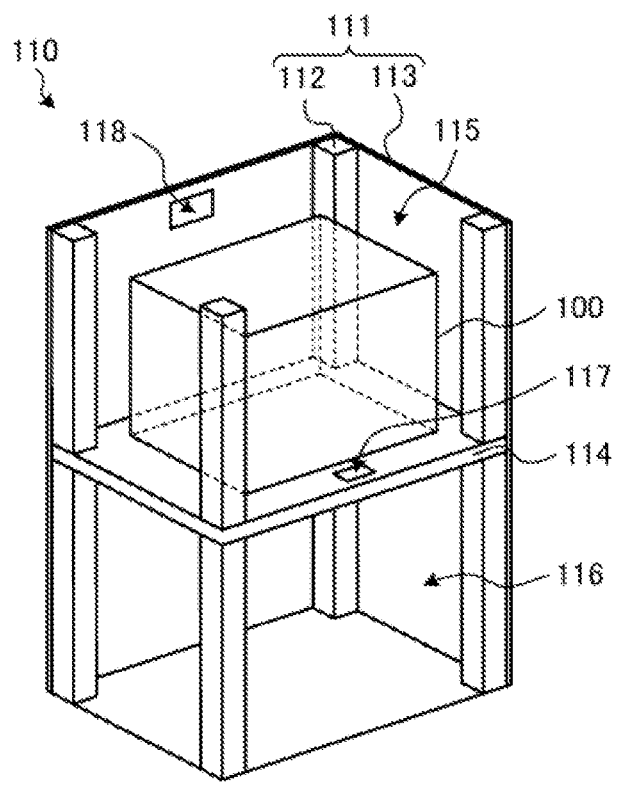
FIG. 6 is an exploded perspective view schematically illustrating an example of a module housing device according to the first embodiment.

FIG. 6 is an exploded perspective view illustrating an example of a module housing device according to the first embodiment. A module housing device 110 according to the present embodiment includes an external case 111, the module 100 illustrated in FIG. 5, and an auxiliary device (not illustrated). The auxiliary device operates the module 100. The module 100 and the auxiliary device are housed in the external case 111. In FIG. 6, a partial configuration is omitted.

The external case 111 of the module housing device 110 illustrated in FIG. 6 includes columns 112 and external plates 113. A dividing plate 114 vertically partitions the interior of the external case 111. The space above the dividing plate 114 in the external case 111 is a module housing room 115 that houses the module 100, and the space below the dividing plate 114 in the external case 111 is an auxiliary device housing room 116 that houses the auxiliary device that operates the module 100. In FIG. 6, the auxiliary device housed in the auxiliary device housing room 116 is omitted.

Additionally, the dividing plate 114 includes an air vent 117 for allowing the air to flow in the auxiliary device housing room 116 toward the module housing room 115. The external plate 113 constituting the module housing room 115 includes an exhaust opening 118 for exhausting air in the module housing room 115.

In such a module housing device 110, as mentioned above, since the module housing room 115 includes a module 100 for reducing the deterioration of the battery performance, the module housing device 110 that reduces the decrease in the battery performance can be provided.

Also, in the embodiment mentioned above, the case where the support substrate having the hollow flat plate type is used has been exemplified; however, the embodiment can also be applied to a cell stack device using a cylindrical support substrate.

Second Embodiment

Subsequently, a cell and a cell stack device according to the second embodiment will be described with reference to FIGS. 7A and 7B.

In the embodiment mentioned above, a so-called "vertical stripe type", in which only one element unit including a fuel electrode, a solid electrolyte layer, and an air electrode is provided on the surface of the support substrate, has been exemplified; however, the embodiment can be applied to a horizontal stripe type cell stack device with an arrangement of a so-called "horizontal stripe type" cell in which element units are provided at a plurality of places separated from each other on the surface of the support substrate and adjacent element units are electrically connected to each other.

Figure 7A:
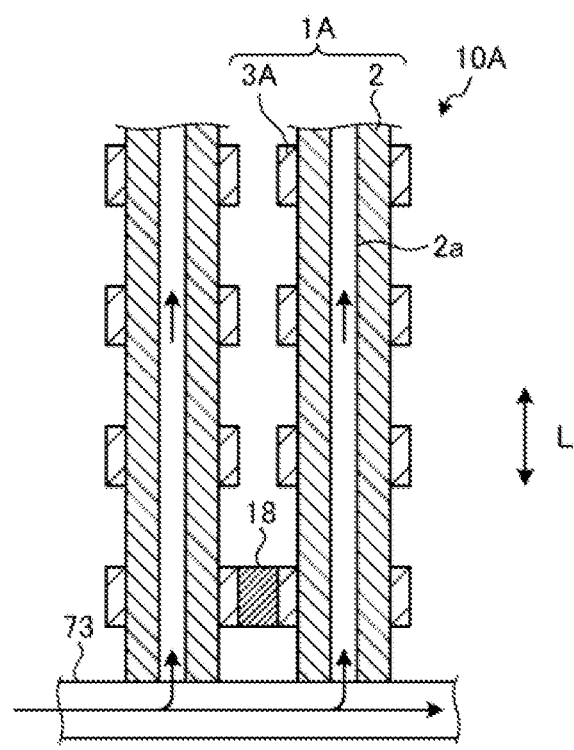
FIG. 7A is a cross-sectional view illustrating a cell according to a second embodiment.

FIG. 7A is a cross-sectional view illustrating the cell according to the second embodiment. In a cell stack device 10A, a plurality of cells A extend in the length direction L from a pipe 73 through which a fuel gas flows. The cell 1A includes a plurality of element units 3A on the support substrate 2. the gas-flow passage 2a through which a gas from the pipe 73 flows is provided inside the support substrate 2. The element units 3A on the support substrate 2 are electrically connected by a connection layer (not illustrated). The plurality of cells 1A are electrically connected to each other via the conductive member 18. The conductive member 18 is located between the element units 3A of each cell 1A and electrically connects adjacent cells 1A to each other. Specifically, a current collector or an interconnector electrically connected to an air electrode of the element unit 3A of one of the adjacent cells 1A is electrically connected to a current collector or an interconnector electrically connected to a fuel electrode of the element unit 3A of the other one of the adjacent cells 1A.

Figure 7B:
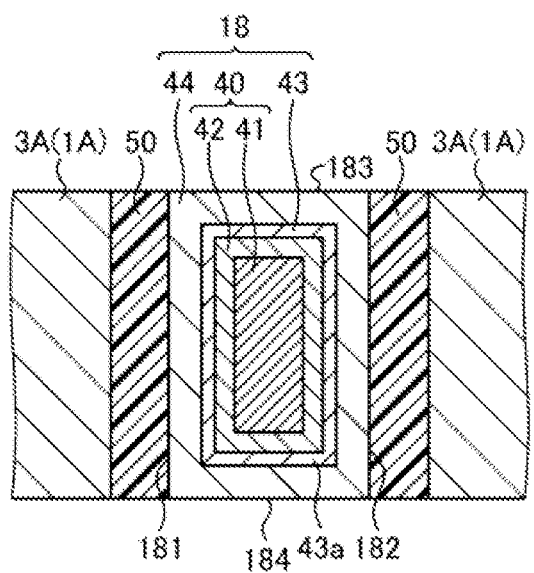
FIG. 7B is an enlarged cross-sectional view of a conductive member according to the second embodiment.

FIG. 7B is an enlarged cross-sectional view of the conductive member according to the second embodiment. As illustrated in FIG. 7B, the conductive member 18 is joined, via the jointing material 50, to each of the cells 1A adjacent to each other. Also, the conductive member 18 has the first surface 181 and the second surface 182 that face each other with the base material 40 interposed therebetween. Also, the conductive member 18 has the third surfaces 183 and 184 that connect the first surface 181 and the second surface 182.

The conductive member 18 is joined to the cell 1A via the jointing material 50. The jointing material 50 is positioned between the first surface 181 of the conductive member 18 and the element unit 3A of one cell 1A and between the second surface 182 of the conductive member 18 and the element unit 3A of the other cell 1A, and joins a pair of the cells 1A facing each other with the conductive member 18 interposed therebetween and the conductive member 18. Also, the third surfaces 183 and 184 are exposed to, for example, an oxidizing atmosphere such as air.

The conductive member 18 includes the base material 40, the covering part 43, and the coating layer 44. Also, the base material 40 includes the first base material layer 41 and the second base material layer 42. Each part constituting the conductive member 18 can be made of, for example, a material as used for the conductive member 18 mentioned above according to the first embodiment mentioned above.

The covering part 43 is located on the base material 40. The covering part 43 is located between the base material 40 and the coating layer 44. The covering part 43 contains the first element 43a. The first element 43a has a smaller value of first ionization energy and a smaller absolute value of free energy formation of oxide than chromium. The covering part 43 may contain, for example, a plurality of the first elements 43a. The covering part 43 may contain a first oxide that is an oxide of the first element 43a. The covering part 43 may be a plurality of particles located on the base material 40 and/or a coating film covering the base material 40. The covering part 43 may contain, for example, $CeO_2$.

In this way, since the conductive member 18 is located on the base material 40 and includes the covering part 43 containing the first element 43a, the growth of the second base material layer 42 is suppressed, so that the conductive member 18 can suppress an increase in internal resistance due to the growth of the second base material layer 42. This can reduce the deterioration of the battery performance of the cell 1A, which can reduce a decrease in the battery performance of the cell stack device 10A.

Third Embodiment

Figure 8A:
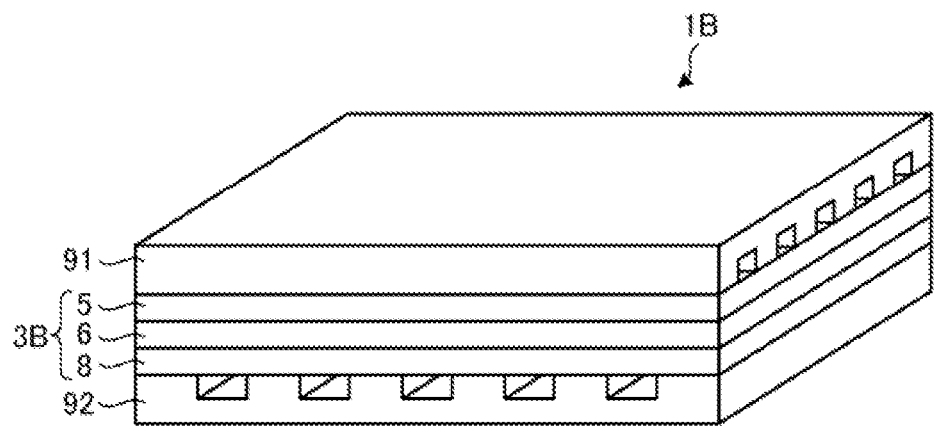
FIG. 8A is a perspective view illustrating a flat plate cell according to a third embodiment.
Figure 8B:
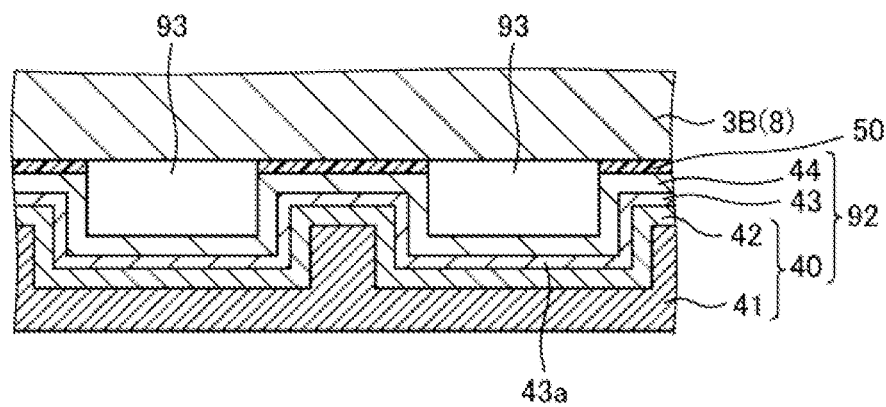
FIG. 8B is a partial cross-sectional view illustrating the flat plate cell illustrated in FIG. 8A.

FIG. 8A is a perspective view illustrating a flat plate cell according to a third embodiment. FIG. 8B is a partial cross-sectional view of the flat plate cell illustrated in FIG. 8A.

As illustrated in FIG. 8A, a cell 1B includes an element unit 3B in which the fuel electrode 5, the solid electrolyte layer 6, and the air electrode 8 are laminated. In a cell stack device in which a plurality of flat plate cells are laminated, for example, a plurality of cells 1B are electrically connected by conductive members 91 and 92 which are metal layers each adjacent to the cells 1B. The conductive members 91 and 92 electrically connect adjacent cells 1B to each other, and each include a gas-flow passage for supplying gas to the fuel electrode 5 or the air electrode 8.

As illustrated in FIG. 8B, in the present embodiment, the conductive member 92 includes a gas-flow passage 93 for supplying a gas to the air electrode 8. The conductive member 92 is joined to the element unit 3B (air electrode 8) via the jointing material 50. The conductive member 92 may be in direct contact with the element unit 3B without the intervention of the jointing material 50. In other words, in the present embodiment, the conductive member 92 may be directly connected to the element unit 3B without using the jointing material 50.

The conductive member 92 includes the base material 40, the covering part 43 containing the first element 43a, and the coating layer 44. Also, the base material 40 includes the first base material layer 41 and the second base material layer 42. Each part constituting the conductive member 92 can be made of, for example, a material as used for the conductive member 18 mentioned above.

The covering part 43 is located on the base material 40. The covering part 43 is located between the base material 40 and the coating layer 44. Also, the first element 43a has a smaller value of the first ionization energy and a smaller absolute value of the free energy formation of oxide than chromium. The covering part 43 may contain, for example, the plurality of the first elements 43a. The covering part 43 may contain a first oxide that is an oxide of the first element 43a. The covering part 43 may be a plurality of particles located on the base material 40 and/or a coating film covering the base material 40. The covering part 43 may contain, for example, $CeO_2$.

In this way, since the conductive member 18 is located on the base material 40 and includes the covering part 43 containing the first element 43a, the growth of the second base material layer 42 is suppressed, so that the conductive member 18 can suppress an increase in internal resistance due to the growth of the second base material layer 42. This can reduce the deterioration of the battery performance of the cell 1B, which can reduce a decrease in the battery performance of the cell stack device.

Other Modifications

Subsequently, a cell stack device according to other modifications of the embodiment will be described.

In the above embodiments, a fuel cell, a fuel cell stack device, a fuel cell module, and a fuel cell device are shown as examples of the "cell", the "cell stack device", the "module", and the "module housing device"; they may also be an electrolytic cell, an electrolytic cell stack device, an electrolytic module, and an electrolytic device, respectively, as another example.

Although the present disclosure has been described above in detail, the present disclosure is not limited to the embodiments mentioned above, and various changes, improvements, or the like can be made without departing from the gist of the present disclosure.

As mentioned above, the conductive member 18 according to the embodiment includes the base material 40 and the covering part 43 located on the base material 40 and containing the first element 43a. The base material 40 contains chromium. The first element 43a has a smaller value of first ionization energy and a smaller absolute value of free energy formation of oxide than chromium. This can reduce an increase in internal resistance of the conductive member 18.

Also, the cell 1 according to the embodiment includes the element unit 3 and the conductive member 18 mentioned above. The conductive member 18 is connected to the element unit 3. Thus, the cell 1 that reduces a decrease in battery performance due to an increase in internal resistance can be provided.

Also, the cell stack device 10 according to the embodiment includes the cell stack 11 including the plurality of cells 1 mentioned above. Thus, the cell stack device 10 that reduces a decrease in battery performance due to an increase in internal resistance can be provided.

The module 100 according to the embodiment includes the cell stack device 10 described above, and a housing container 101 for housing the cell stack device 10. Thus, the module 100 that reduces a decrease in battery performance due to an increase in internal resistance can be provided.

The module housing device 110 according to the embodiment includes the module 100 mentioned above, the auxiliary device for operating the module 100, and the external case for housing the module 100 and the auxiliary device. Thus, the module housing device 110 that reduces a decrease in battery performance due to an increase in internal resistance can be provided.

The embodiments disclosed herein should be considered exemplary in all respects and not restrictive. Indeed, the embodiments described above may be embodied in a variety of forms. The embodiments described above may be omitted, replaced, or modified in various forms without departing from the scope and spirit of the appended claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A conductive member comprising:
a base material containing chromium; and
a covering part located on the base material, having a thickness that is 150 nm or less, and containing a first element having a smaller value of first ionization energy and a smaller absolute value of free energy formation of oxide than chromium.

2. The conductive member according to claim 1, wherein the covering part contains a first oxide that is an oxide of the first element.

3. The conductive member according to claim 1, wherein
a coating layer provided on the base material, the coating layer having a composition different from a composition of the covering part, and
the covering part is located between the base material and the coating layer.

4. The conductive member according to claim 3, wherein
the covering part contains a first oxide that is an oxide of the first element,
the coating layer contains a second oxide containing manganese (Mn) and cobalt (Co), and
the second oxide contained in the coating layer has a molar ratio of Mn greater than a molar ratio of Co.

5. The conductive member according to claim 3, wherein
the coating layer is porous.

6. The conductive member according to claim 1, wherein
the covering part comprises a plurality of particles containing the first element.

7. The conductive member according to claim 1, wherein
the covering part comprises a coating film containing the first element and covering the base material.

8. A cell comprising:
an element unit including a fuel electrode, a solid electrolyte layer, and an air electrode; and
the conductive member according to claim 7, the conductive member being connected to the element unit, wherein
the conductive member includes a first surface connected to the element unit, a second surface located away from the element unit, and a third surface that connects the first surface and the second surface, and
a first average thickness of the covering part located between the first surface and the base material is different from a second average thickness of the covering part located between the third surface and the base material.

9. The cell according to claim 8, wherein
the first average thickness is greater than the second average thickness.

10. A cell stack device comprising:
a plurality of the cells according to claim 8.

11. A cell comprising:
an element unit including a fuel electrode, a solid electrolyte layer, and an air electrode; and
the conductive member according to claim 1, the conductive member being connected to the element unit.

12. The cell according to claim 11, wherein
the conductive member comprises a first surface connected to the element unit, a second surface located away from the element unit, and a third surface that connects the first surface and the second surface, and
a first area ratio of the covering part located between the first surface and the base material is different from a second area ratio of the covering part located between the third surface and the base material.

13. The cell according to claim 12, wherein
the first area ratio is greater than the second area ratio.

14. A cell stack device comprising:
a plurality of the cells according to claim 11.

15. A module comprising:
the cell stack device according to claim 14; and
a housing container that houses the cell stack device.

16. A module housing device comprising:
the module according to claim 15;
an auxiliary device for operating the module; and
an external case that houses the module and the auxiliary device.

* * * * *